United States Patent
Kato et al.

(10) Patent No.: US 9,654,415 B2
(45) Date of Patent: May 16, 2017

(54) INFORMATION PROCESSING SYSTEM, MANAGEMENT SERVER GROUP, AND SERVER MANAGEMENT PROGRAM

(75) Inventors: Takatoshi Kato, Tokyo (JP); Yutaka Kudo, Tokyo (JP); Naoto Matsunami, Tokyo (JP); Akira Fujibayashi, Tokyo (JP)

(73) Assignee: HITACHI, LTD., Tokyo (JP)

( * ) Notice: Subject to any disclaimer, the term of this patent is extended or adjusted under 35 U.S.C. 154(b) by 221 days.

(21) Appl. No.: 14/395,670

(22) PCT Filed: Apr. 20, 2012

(86) PCT No.: PCT/JP2012/002730
§ 371 (c)(1),
(2), (4) Date: Jan. 16, 2015

(87) PCT Pub. No.: WO2013/157042
PCT Pub. Date: Oct. 24, 2013

(65) Prior Publication Data
US 2015/0163163 A1    Jun. 11, 2015

(51) Int. Cl.
| | | |
|---|---|---|
| G06F 15/173 | (2006.01) | |
| H04L 12/917 | (2013.01) | |
| H04L 29/06 | (2006.01) | |
| H04L 29/08 | (2006.01) | |
| H04W 40/20 | (2009.01) | |

(52) U.S. Cl.
CPC .......... *H04L 47/76* (2013.01); *H04L 65/1063* (2013.01); *H04L 67/34* (2013.01); *H04W 40/20* (2013.01)

(58) Field of Classification Search
CPC ... H04L 12/917; H04L 65/1063; H04L 47/76; H04L 67/34; H04W 40/20
See application file for complete search history.

(56) References Cited

U.S. PATENT DOCUMENTS

| | | | |
|---|---|---|---|
| 7,734,815 B2 | 6/2010 | Leighton et al. | |
| 7,840,673 B1* | 11/2010 | O'Crowley | H04L 67/1002 709/201 |
| 8,073,961 B2 | 12/2011 | Leighton et al. | |
| 2005/0097086 A1* | 5/2005 | Merchant | G06F 17/30595 |

(Continued)

FOREIGN PATENT DOCUMENTS

| | | |
|---|---|---|
| JP | 10-247177 A | 9/1998 |
| JP | 11-143836 A | 5/1999 |
| JP | 2009-252075 A | 10/2009 |

*Primary Examiner* — Benjamin M Thieu
(74) *Attorney, Agent, or Firm* — Volpe and Koenig, P.C.

(57) ABSTRACT

This invention includes an application server for executing an application and transmitting the execution results to a terminal or other such device connected to a network, and a management server for allocating the application and data on an application server and a storage device, respectively, wherein the management server reallocates the application execution site using: a procedure for obtaining device location information from a device via an application server and selecting, from the location information, an application server that will be the application migration destination; a procedure for indicating the migration-destination application server to the migration-source application server; and a procedure for migrating the application and the data between the application servers.

12 Claims, 12 Drawing Sheets

(56) References Cited

U.S. PATENT DOCUMENTS

| | | | |
|---|---|---|---|
| 2005/0273486 A1* | 12/2005 | Keith, Jr. | G06F 21/10 709/200 |
| 2006/0092861 A1* | 5/2006 | Corday | H04L 41/0213 370/256 |
| 2009/0144393 A1* | 6/2009 | Kudo | G06F 9/5044 709/218 |
| 2009/0260005 A1 | 10/2009 | Nakagawa et al. | |
| 2009/0276771 A1* | 11/2009 | Nickolov | G06F 9/4856 717/177 |
| 2011/0202658 A1 | 8/2011 | Okuno et al. | |
| 2013/0282791 A1* | 10/2013 | Kruglick | G06F 3/0647 709/203 |

\* cited by examiner

MANAGEMENT SERVER A 1 0 1
MANAGEMENT SERVER B 1 1 1
MANAGEMENT SERVER C 1 2 1
MANAGEMENT SERVER D 1 3 1
MANAGEMENT SERVER E 1 4 1
SERVER B 1 1 2
SERVER C 1 2 2
SERVER D 1 3 2
SERVER E 1 4 2

FIG. 6

| NAME | ID | SIZE | PATH NAME | REPLICATION | OWNER | PERMISSION | UTILIZED APPLICATION | OTHER |
|---|---|---|---|---|---|---|---|---|
| file0001 | 00000001 | 2048 | server1¥xx¥xx | x | 0001 | 0001,0002 | app1-1 | x |
| ... | ... | ... | ... | ... | ... | ... | ... | ... |

601, 602, 603, 604, 605, 606, 607, 608, 609

600

FIG. 8
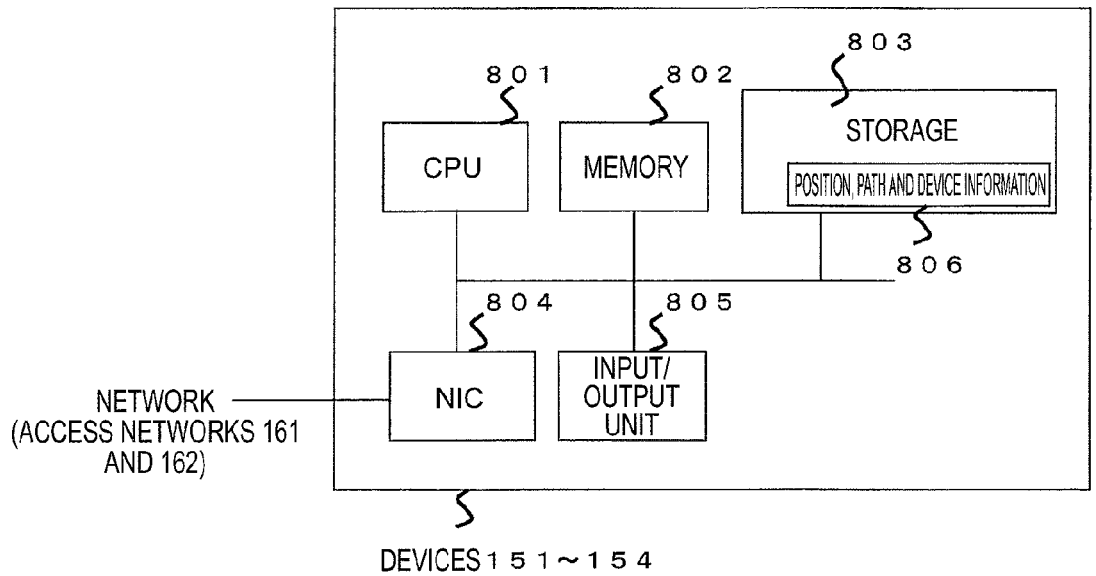
FIG. 9
| 901 | 902 | 903 | 904 | 905 | 906 | 907 |
|---|---|---|---|---|---|---|
| INFORMATION PROCESSING SITE ID | INFORMATION PROCESSING SITE NAME | INFORMATION PROCESSING SITE POSITION | NETWORK INFORMATION | INFORMATION PROCESSING SITE FORM | SECURITY LEVEL | RISK IN DISASTER AND POWER FAILURE |
| 001 | A-1 | 35°40'52" NORTH LATITUDE 139°45'57" EAST LONGITUDE | xxx.xxx. xxx.xxx | TOWN AREA DC(T1) | B | A |
| 002 | ⋮ | ⋮ | ⋮ | ⋮ | ⋮ | ⋮ |
900 INFORMATION PROCESSING SITE INFORMATION MANAGEMENT TABLE
FIG. 10
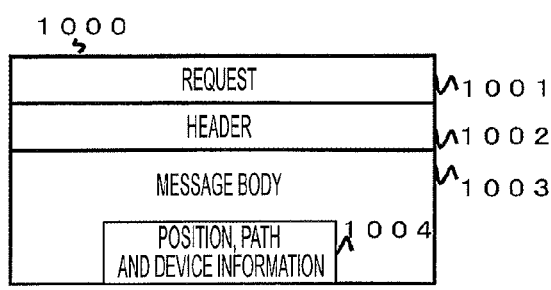

FIG. 11

| 1101 | 1102 | 1103 | 1104 | 1105 | 1106 | 1107 | 1108 | 1109 | 1110 | 1111 |
|---|---|---|---|---|---|---|---|---|---|---|
| ID | SERVER NAME | ADDRESS | ALLOCATABLE MEMORY | ALLOCATABLE STORAGE | CPU | VM CLASSIFICATION | OPERABLE AP CLASSIFICATION | OPERATION AP INFORMATION | AP OPERATION RESULTS | COST |
| 00001 | Server 01-a | 10.10.10.1 | 16G Byte | 10T Byte | a-COMPANY, bb | VM1 VM2 | AP1 AP2 | AP1 | AP1 | 150W,¥170 |
| 00002 | ... | ... | ... | ... | ... | ... | ... | ... | ... | ... |

1100 MANAGEMENT TABLE

| 1201 | 1202 | 1203 | 1204 | 1205 | 1206 |
|---|---|---|---|---|---|
| APID | AP NAME | DELIVERY DESTINATION | OPERATION SITUATION | UTILIZATION DEVICE | DELIVERY CONDITION |
| 001 | A-1 | INFORMATION PROCESSING SITE C, SERVER C | OPERATING | DEVICE 1 | OS=x |
|  |  | INFORMATION PROCESSING SITE C, SERVER C | OPERATING | DEVICE 2 |  |
|  |  | INFORMATION PROCESSING SITE B, SERVER B | OPERATING | DEVICE 3 |  |
| 002 | ⋮ | ⋮ | ⋮ | ⋮ | ⋮ |

1200 SERVICE INFORMATION TABLE

INFORMATION PROCESSING SYSTEM, MANAGEMENT SERVER GROUP, AND SERVER MANAGEMENT PROGRAM

TECHNICAL FIELD

The technique disclosed in this specification relates to an application and data utilization method in an information processing system connected to a wide-area computer network.

BACKGROUND ART

The information processing system connected to the wide-area computer network generally adopts a form of utilizing the processing function of information processing apparatuses arranged in a central data center to transmit processing results to terminal devices. Particularly, in a utilization form of the information processing system named a cloud computing, processing is concentrated in the information processing apparatuses such as servers and storages in the data center and the user utilizes the information processing apparatus from the outside connected to the data center through the network generally. The information processing apparatuses are concentrated in the data center by the cloud computing to thereby make it possible to minimize the system construction cost and the running cost.

In the utilization form named the cloud computing, the user receives provision of a server and a storage from a dealer making hosting to operate an application program (named an application or AP) on the server and store data in the storage, so that the user utilizes the information processing function using the server and the storage from a remote place. In this manner, the forms that the application is operated and the data is stored in the storage to be utilized are named application hosting and data hosting, respectively.

In the cloud computing, since processing is concentrated in the information processing apparatus in the data center, the quality of responses to information processing requests (throughput and response time of transfer data) is reduced when the users of system are increased and the information processing requests are increased to the information processing apparatuses in the data center from a lot of terminals. In order to keep the quality of the responses to the requests, it is necessary to increase the connection lines. In a company that provides the information processing apparatuses in the data center, the increased cost for increasing the lines is a problem on operation of business. Particularly, in recent years, until now, the problem is not expanded due to conditions that the processing performance of the user's terminal is not high or the access speed to a wireless access network for connecting the user's terminal to a core network is slow, although the request to the quality for the processing time is enhanced, so that the problem of further increasing the connection lines (securing the line quality) arises.

Accordingly, data center provider or business companies which borrow facilities from the data center provider to be utilized in hosing business or in its own company deliver replications of application and data in the information processing apparatuses installed dispersedly in the wide-area network and take load distribution measures for reducing the utilization frequency of the information processing apparatuses in the central data center, so that the quality of responses to the information processing requests is kept. As one of such load distribution techniques, the contents delivery network (CDN) is given. The CDN technique is disclosed in Patent Literatures 1 and 2, for example.

Furthermore, Patent Literature 3 describes a system which can change an information processing position by using an intelligent node having information processing function and any address change function to provide an information processing system with small delay.

CITATION LIST

Patent Literature

Patent Literature 1: U.S. Pat. No. 8,073,961
Patent Literature 2: U.S. Pat. No. 7,734,815
Patent Literature 3: US Patent Application Publication No. 2011/0202658

SUMMARY OF INVENTION

Technical Problem

In the CDN technique described in the Patent Literatures 1 and 2, data such as digital contents containing music and animation are delivered mainly. Delivery points of data are provided in various places in the network and access to a proper delivery point is instructed in accordance with the user's position in the network, so that a large amount of contents can be distributed to the user smoothly. Thus, the problem that a heavy load is applied to the network when data to be delivered is distributed from the central data center is solved.

In the general CDN technique, the distribution method is divided by the classification of data. In the processing requiring dynamic creation such as the processing utilizing information different in each user and stored in a database (DB) and the processing utilizing information to be updated successively, the information to be utilized is not delivered to the server existing in the delivery point. Accordingly, in the processing requiring the dynamic creation, communication from the terminal to the server (original server) of the central data center which is a center of information processing is generated. In this manner, when the processing results are different every time, the processing amount in the central data center is enormous and security of the line quality in the central data center is a problem in operation of business.

In other words, in the CDN technique, the data distribution method suitable for distribution of static contents of digital contents and the like is shown, although application to the information processing system which performs information processing different every time is less effective and it is expensive to maintain the line quality. Even in the processing requiring the dynamic creation, the processing which can be delivered in the delivery point by previous processing can solve the problem by delivery, although when cache of the processed data to the data center of edge which is the delivery point is performed endlessly, storage of the data center of the edge and resource of the network in transfer are consumed and accordingly the increased cost is a problem in operation of business.

In a data center intensive information system described in the Patent Literature 3, the information processing position is migrated to a node near to the terminal so as to make small delay operation in a platform having a construction in which migration can be made seamlessly while making consistency with the information system such as an existing data center. However, a method of arranging the application for making dynamic creation processing in a network node or the like and the data in the delivery point and suppressing the resource use amount concerning particularly the storage resource in the delivery point is not disclosed in detail.

As described above, in the information processing system which performs existing distributed application and data hosting, when processing concentration by access from a terminal device connected to the network such as the terminal is substituted by server and storage of a substitute data center, the increased cost by reinforcement of the network is a problem in operation of business when the load applied to the network access to the central data center is reduced while suppressing the transfer amount of data via network and the storage use amount.

Solution to Problem

Disclosed is a method which cannot be solved by the known technique and which reduces the load applied to the network access to the central data center having an original sever while suppressing the resource use amount in the delivery point necessary for cache of application and data in the information processing system which makes distributed application and data hosting in which application for making dynamic creation processing is delivered in the delivery point.

Disclosed in the specification are a distributed application, a data hosting method and an information processing system for realizing the method in which an application server for executing the application and transmitting the execution results to a terminal or a device connected to a network and a management server for deploying the application and data on an application server and a storage, respectively, are included and the management server redeploys the application execution site using a procedure for obtaining device location information from a device via the application server and selecting, from the location information, an application server that will be the application migration destination, a procedure for indicating the migration destination application server to the migration source application server and a procedure for migrating the application and the data between the application servers.

According to the above method, there can be provided the wide-area distributed application and the data hosing method in which a load applied to the network access to a specific information processing apparatus and the information processing apparatus which provides the application and the data is reduced while suppressing a resource use amount of the information processing apparatuses necessary for cache of the application and the data on the distributed information processing apparatuses.

According to the above aspect, there can be provided a wide-area distributed information processing system in which a network load on a specific data center is not concentrated while suppressing the resource use amount in a delivery point necessary for distribution of the application and the data in the system in which information processing apparatuses deployed dispersedly in the network are operated in cooperation with each other and deliver the application and the data to wide-area delivery points.

Further, according to the above aspect, the system in which a response time of the data center intensive information system is improved can be provided to thereby shorten the response time when the user of the system receives the information processing service and improve quality of experience of the user effectively.

Moreover, according to the above aspect, since the network load on the specific data center is not concentrated as compared with the data center intensive information system having the same quality, there can be provided the information system which can suppress a transfer amount and a band of the network connected to the data center and reduce the cost effectively.

Other features and advantages will be apparent from the following disclosure of embodiments taken in conjunction with the accompanying drawings.

Advantageous Effects of the Invention

According to the disclosure, the information system which improves the quality of experience of the user can be provided effectively at low cost.

BRIEF DESCRIPTION OF DRAWINGS

FIG. 6 is a diagram illustrating the metadata of the second embodiment in detail;

FIG. 8 is a diagram illustrating the configuration of a device of the information processing system of the first embodiment;

FIG. 9 is a diagram illustrating an information processing site information management table utilized in judgment of migration of application in the information processing system of the first embodiment;

FIG. 10 is a diagram illustrating an example of a processing request transmitted by a device of the first embodiment;

FIG. 11 is a diagram illustrating a management table in which resources and operation conditions are managed by a management server of the first embodiment;

DESCRIPTION OF EMBODIMENTS

Figure 1:
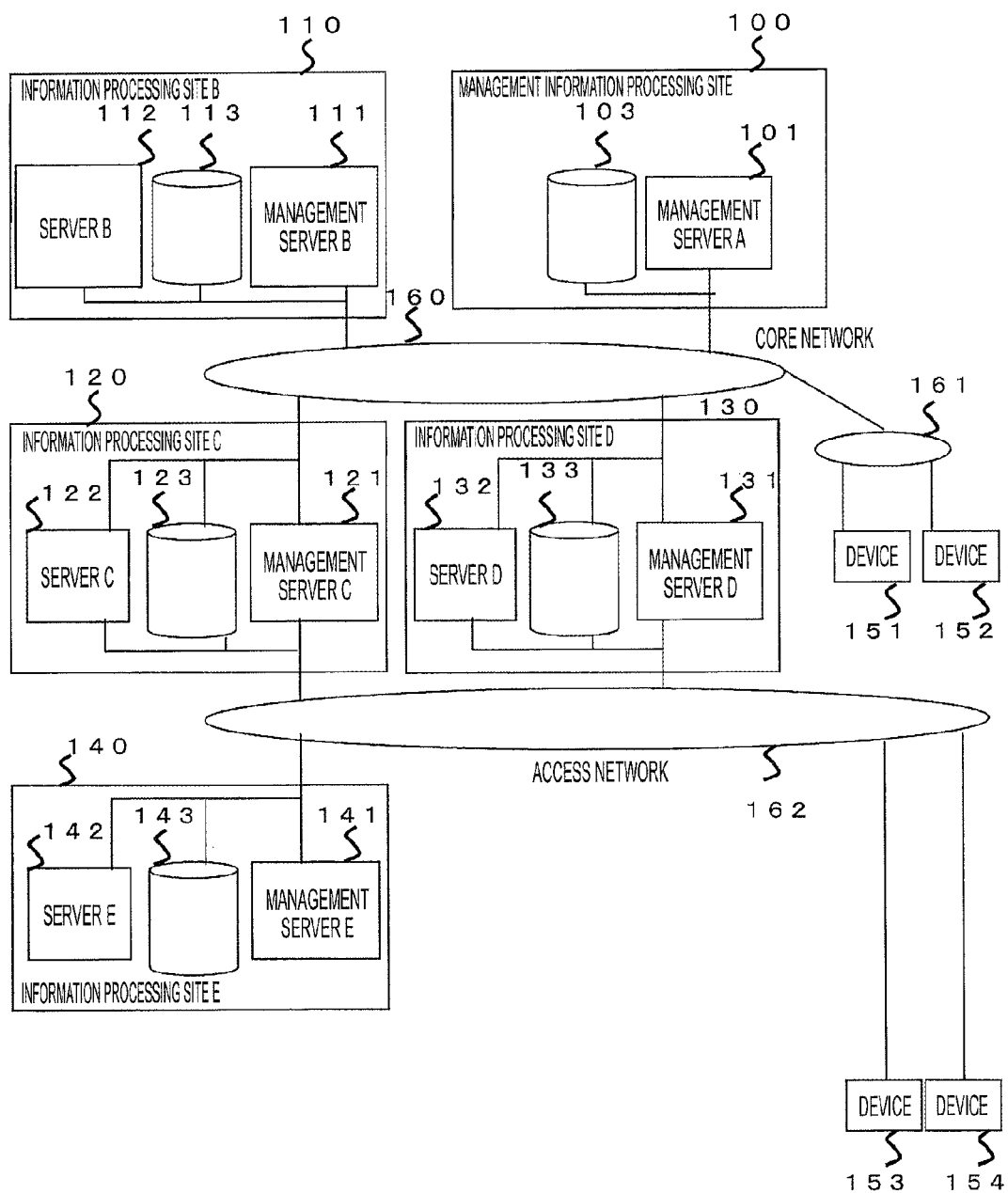
FIG. 1 is a diagram illustrating a system configuration of an information processing system of a first embodiment.

Embodiments are now described with reference to the drawings. The same reference numerals in the drawings represent the same elements.

FIG. 1 schematically illustrates the configuration of an information processing system of a first embodiment. The information processing system of the embodiment includes servers and management servers installed in a management information processing site and information processing sites B, C, D and E and devices such as terminals and sensors connected through a core network and access networks.

The information processing site B 110 is an information processing site connected to the core network to make information processing required by the user and generally is a data center or a predetermined area installed in the data center.

The information processing sites described in the embodiment include servers, management servers, storages and devices connected within a network segment of a predetermined range in the data center or the predetermined area installed in the data center.

For example, the information processing site is an equipment including the whole data center, a section of the data center, a rack of the data center, an apparatus installed in a building, an apparatus installed in a network base station, a kiosk terminal device installed in a retail store, an automatic cash paying machine, a vending machine, a communication apparatus such as a portable phone and a fixed-line phone, an equipment incidentally installed in power pole and a road side unit (RSU) obtaining information by radio from a sensor or onboard apparatus.

A management server B 111, an application server B 112 and a storage 113 are installed in the information processing site B 110 and are connected through the network such as the core network and the access network to information processing apparatuses such as servers, terminals and devices described later. One or two or more management servers and servers are installed in the information processing site B. All application servers are managed by any management server and execution of application and utilization of storage in the application servers are managed. In the following description, the application server is merely named a server.

A server (management server A 101) which centrally makes control of information processing in the information processing system of the embodiment and a storage 103 which is a management storage are installed in a management information processing site 100, in which information processing is managed by a provider which provides (makes hosting) the information processing required by the user. The management server A 101 is connected through the network such as the core network and the access network to the management server B 111, the server B 112, the storage 113 and information processing apparatuses described below. The management server A 101 is a management server which manages the management servers such as the management server B 111 concentratedly and instructs the management servers to make execution of application and storing of data into the storage in the information processing sites.

Information processing sites C 120 and D 130 are connected to the core network 160 and include facilities installed to execute the above information processing dispersedly. Generally, the information processing sites C 120 and D 130 are data centers of the hosting provider or predetermined areas installed in the data center.

A management server C 121, a server C 122 and a storage 123 are installed in the information processing site C 120 and a management server D 131, a server D 132 and a storage 133 are installed in the information processing site D 130. The respective management servers and servers are connected through network such as the core network 160 to the management servers A 101, B 111, the server B 112 and the information processing apparatuses described later. One or two or more management servers and servers are installed in the information processing sites C 120 and D 130. All servers are managed by any management server and execution of application and utilization of storage in the servers are managed.

Further, the respective management servers and servers in the information processing sites C 120 and D 130 are connected even to the access network 162. The access network 162 is a local network for connecting terminals described later and an information processing site E 140. Communication from devices connected to the access network 162 to the core network 160 is made by a network device installed in the information processing sites C 120 and D 130 but not shown and communication from the core network 160 to devices connected to the access network 162 is also made in the reverse direction. The access network 162 is wired local area network (LAN), wireless LAN, short-distance wireless communication or the like, for example.

The information processing site E 140 is connected to the access network 162 and includes facilities installed to execute the above information processing dispersedly. Generally, the information processing site E 140 is a data center of the hosting provider, a predetermined area installed in the data center or an area installed by the hosting provider as an information processing site of an area or equipment for making information processing in the town.

A management server E 141, a server E 142 and a storage 143 are installed in the information processing site E 140. The management server and the server are connected through the access network 162 to other information processing sites and connected to the information processing apparatuses described before or later such as the management servers A 101, B 111 and the server B 112 by a network device not shown through the core network 160. One or plural management servers and servers are installed in the information processing site E 140. All servers are managed by any management server and execution of application and utilization of storage in the servers are managed.

Devices (151-154) are control devices such as terminals operated or installed by the user or sensors in order to utilize the information processing system of the embodiment connected to the access network 162 or the core network 160 through the access network 161. The devices 151 to 154 are control apparatuses such as, for example, terminal devices having user interfaces of any one or more kinds of car navigators, PC's, smart phones, portable phones or home appliances or sensors (for example, measuring instruments such as meter devices, thermometers or wattmeters) or people flow analyzers or monitoring cameras or authentication devices or the like.

The devices 151 to 154 are connected to the servers through the network and transmit an information processing request to be made in the server and/or data for information processing to the server and make the server perform the information processing.

In the information processing system of the embodiment, when the devices such as the devices 151 to 154 transmit the information processing request to the server which performs the information processing, the management server moves the information processing required by the user to the distributed information processing apparatuses in accordance with utilization situation of the devices to reduce the load applied to the network access connected to a specific information processing apparatus while suppressing the resource use amount necessary for the information processing and improve the response performance of the information processing apparatus.

Here, the storage in the information processing site is described as a device independent of the server, although the storage may be a storage such as a flash memory or hard disk mounted in the server or virtual storages collected virtually in the server.

Figure 2:
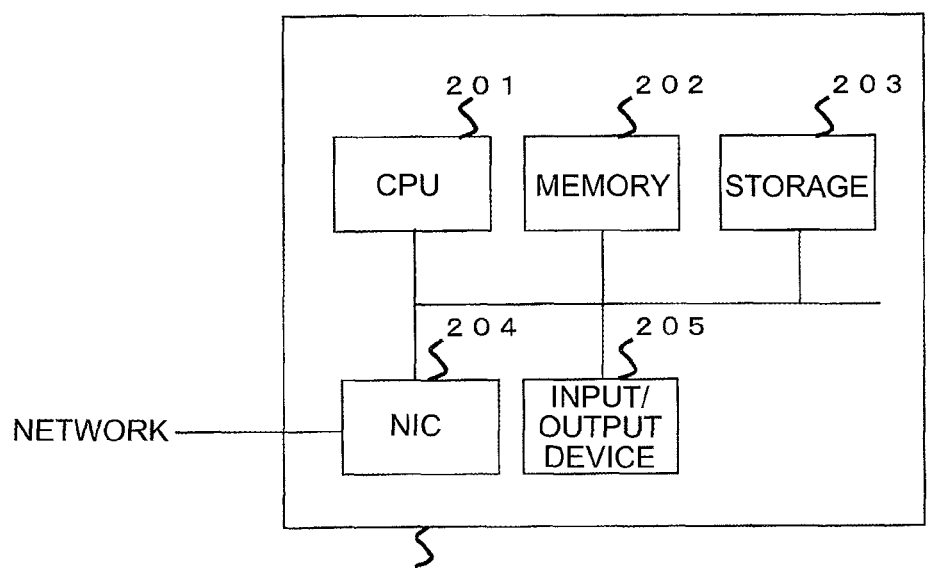
FIG. 2 is a diagram illustrating a hardware configuration of servers and management servers of the information processing system of the first embodiment.

FIG. 2 illustrates a hardware configuration of a computer which realizes the above management server and application server.

Figure 4:
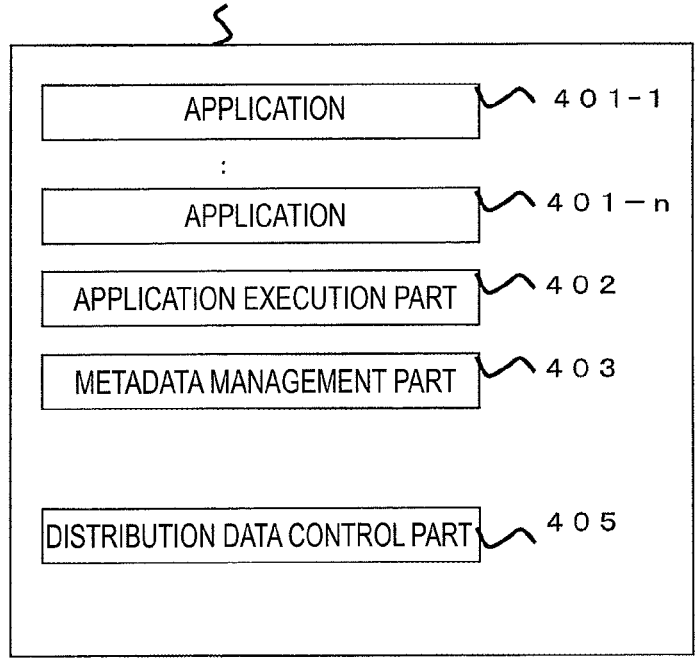
FIG. 4 is a diagram illustrating function of servers in the information processing system of the first embodiment.

Further, FIG. 4 illustrates a functional configuration of each application server. The functions are realized by reading out programs stored in a storage 203 of FIG. 2 by a CPU 201 and executing the programs in a memory 202. The programs may be stored in the storage 203 in the computer previously or may be introduced from another apparatus into the storage 203 through an input/output device 205, a NIC 204 and the medium utilizable by the computer if necessary. The medium indicates a memory medium detachable from the input/output device 205 or a communication medium connectable to the NIC 204 (that is, wired, wireless or optical network) or a carrier wave or digital signal transmitted in the network.

An application execution part 402 has the function of managing execution of applications 401-1 to 401-n. The application execution part 402 communicates with the application execution part of other server and the management server and migrates the application. The application execution part 402 makes execution and stop of the applications 401-1 to 401-n in accordance with instructions of the management server. A metadata management part 403 generates metadata of data object and transmits the metadata to the management server in the information processing sites when data in the storage 203 is generated, updated, added or deleted.

A distribution data control part 405 makes communication with a distribution data control part of other server mutually and makes generation, update, addition and deletion of data in the storage in the server or the same information processing site in accordance with instructions of the management server. Further, the distribution data control part 405 generates a replication of updated or added data object in another server in accordance with instructions of the management server. This generation method of the replication of the data is described later.

Figure 3:
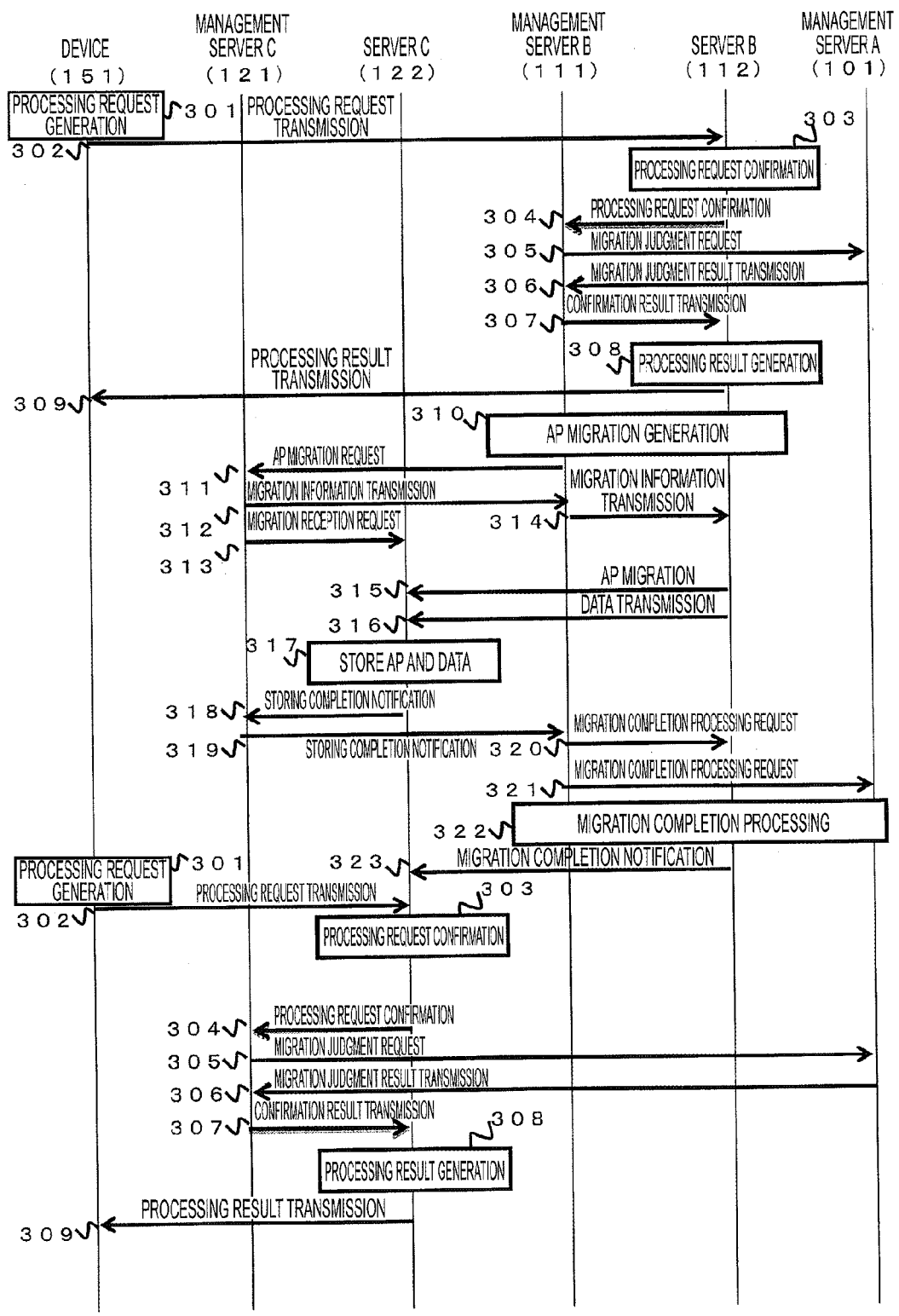
FIG. 3 is a sequence diagram illustrating operation at the time that application and data are migrated to distributed information processing apparatuses in the information processing system of the first embodiment.

FIG. 3 is a sequence diagram showing operation when the information processing apparatuses such as servers performing information processing are moved to the distributed information processing apparatuses in response to the information processing request from the device in the information processing system of the embodiment.

The following description is made using the device 151 as the device, although operation is the same even in case of another device. The device 151 first generates a request of information processing desired to make the information processing apparatus (server) perform (301). The information processing request is, for example, indication of URI desired to be displayed in browser application on PC (device 151) when the device 151 is PC or indication of path name or file name of contents desired to be displayed in document display application. For example, when the device 151 is a sensor or a monitoring camera, the information processing request is transmission contents including measurement data and/or recorded data (for example, any one or more kinds of measured temperature, power consumption, recorded voice, recorded image and the like) desired to make the server in the information processing site B 110 perform information processing and indication of processing for the data.

The device 151 transmits the processing request to the server B 112 in processing request transmission (302) in order to make the server B112 perform the information processing of the contents generated in the information processing request 301. Here, information indicating which server (in this case, server B 112) the processing request generated by the device 151 itself is transmitted is previously held by previously registering the name of the server B 112 and the address in the network such as IP address in the device 151 or by inputting them by the user upon utilization. For example, when the information processing desired by the user is related to a certain URI, the network address of the server which performs information processing can be cleared by making inquiry to a DNS server from a client program named a resolver in the device, so that the device can access the server which provides the information processing desired by the user.

Communication from the device 151 to the server B 112 is made by a communication program not shown operated in the memory described later and recorded in the device 151. The address in the network of the server B 112 is obtained by making inquiry to the DNS server in the network by the communication program as described above and the communication program makes communication between the communication program in the server B 112 and the device 151. The server B 112 decides, in a processing request confirmation step (303), the application for processing the contents of the processing request received in the processing request transmission (302). It is confirmed whether the application for performing the processing request is present in the server and can be operated.

Generally, plural servers having the same function as a certain server are installed in the data center and an additional distribution apparatus such as a load balancer is installed just before the server group to thereby perform processing for distributing connection to the server which performs information processing for each device which makes communication to the server. In the embodiment, for simplification, there is described that all connection from the apparatus is processed by the server B 112, although it is the same even if information processing is additionally distributed to be performed in the server group having the same function as the server B 112 in each device.

When the processing request confirmation (303) in the server B 112 is ended and the application for processing the contents of the received processing request is not operated, the server B 112 returns an error to the effect that the application is not operated and the information processing request cannot be performed to the device 151 by the procedure not shown. When the application for performing the processing request is operated and the information processing request can be processed, the server B 112 requests the management server B 111 to make the processing request confirmation (304).

The step of the processing request confirmation 304 may be made every time when the processing request is transmitted from the device 151 or only when the processing is first made within a predetermined period or at a predetermined frequency within the predetermined period. In the step 304 for requesting the processing request confirmation, the contents of the processing request transmitted by the device 151 are contained in information transmitted in step 304 and accordingly the management server B 111 obtains information of the device 151.

Here, referring to FIG. 10, an example of the processing request transmitted by the device 151 is described. A processing request 1000 describes the contents of request at the time that the device 151 transmits an HTTP request as the processing request to the server B 112 that is an HTTP server. The processing request 1000 includes a request 1001, a header 1002 and a message body 1003. The request 1001 is a main body of the contents of the HTTP request. The request 1001 includes, for example, a command to the server and data information and path name for the request such as URI and the server B 112 performs the information processing in accordance with the request contents.

The header 1002 is information for making the server recognize detailed part of the HTTP request. The header 1002 includes, for example, a data type and a compression method of data supported by application on the transmission side, classification of application and the like. The body 1003 is an area used to transmit data to the server and includes text data desired to be transmitted. In the processing request of the embodiment, position information, path information and device information are contained in the processing request 1000 to be transmitted in a predetermined format if necessary.

FIG. 10 shows an example where position, path and device information 1004 is inserted in the body 1003 to be transmitted. The position, path and device information 1004 is information containing any one or more kinds of position information of the device 151, path information to server and management server for performing information processing from the device 151 and classification information of the device 151.

The position information contains, for example, information of latitude, longitude, altitude and the like (provided from measurement function of device) at present position of the device 151, ID number previously set for area, classification of access network through which the terminal makes communication and information processing site nearest to terminal. Further, the path information contains IP address of terminal, path information from terminal to specific server and the like. The classification information of terminal contains classification of device operating in terminal, classification and version of OS and application operating in terminal and classification and version of transmission and reception protocol supported and the like. Moreover, the device information contains former execution history of information processing requiring execution, time required for execution and quality. The position, path and device information 1004 is transmitted to the server B 112 by the device 151 to thereby judge migration of application by the management server (101, 111) as described later.

Such position, path and device information is transmitted from device 151 to the server B 112 and the management server B 111, so that the speed of the information processing of the device 151 can be improved and deployment of application and data for performing information processing for reduction of the information processing cost can be instructed to the server by the management server in the information processing system to thereby configure the system.

Next, referring to FIG. 8, configuration of the devices 151 to 154 is described. The devices 151 to 154 include, as shown in FIG. 8, a CPU 801, a memory 802, a storage 803, a NIC (network interface card) 804 and an input/output unit 805. The devices 151 to 154 preserve a communication program with a server not shown in the storage 803 and utilizes the communication program read in the memory 802 to make communication with the server in the network through the NIC 804 by the CPU 801.

The storage 803 stores therein position, path and device information 806. The device information 806 contains position information of the device, path information from the terminal to the server and the management server for performing information processing and classification information of the device. The position information of the position, path and device information 806 is generated or previously set by the user by utilizing measurement function of position and/or height of GPS or the like included in the devices 151 to 154 when the user utilizes the terminal or the terminal is operated. Further, the path information is generated from address information given by the communication program or the path information to the server. Moreover, the device information contains classification of terminal, classification and version of operating OS and application, classification and version of supported transmission and reception protocol and the like recorded by the user upon shipping of terminal or previously. Further, the device information contains any one or more kinds of former execution history of the information processing requiring execution, time required for execution and quality.

The position, path and device information 806 stored in the storage 803 is read in the memory 802 during operation of the devices 151 to 154 and all or a part of them is transmitted to the server as the position, path and device information 1004. The position, path and device information 1004 is utilized by the server and management server, so that a delivery place of application and data is indicated from the management server to the server. The device information transmitted to the server is a newest value or average value of information preserved in the position, path and device information 806.

Here, description is returned to description of the processing using FIG. 3. Judgment of migration as to whether the application operated in the server B 112 and performing information processing required by the device 151 is operated in other server except the server B 112 is made on the basis of the processing request confirmation (304) transmitted from the server B 112. The migration judgment method is described later.

When it is judged that the migration is required from the migration judgment results described later, the management server B 111 transmits a migration judgment request (305) to the management server A 101. The management server A 101 is a higher rank management server of the management server B 111. Management of the management servers of the embodiment is controlled in accordance with the previously registered hierarchical structure. In the embodiment, the management server A 101 is a higher rank management server which manages the management servers B 111, C 121 and D 131. The management servers manage execution, migration, stop, deletion and the like of application in accordance with instructions of the higher rank management server. The management server A 101 manages that the devices connected to the network execute which application in which server and perform information processing. The record management method is described later.

In the migration judgment request (305), the management server B 111 transmits the request (containing position, path and device information 1004) received in step 302 from the device 151 and execution situation of application in the management server B 111 to the management server A 101. The management server A 101 makes migration judgment of application similarly to the management server B 111. After the migration judgment is made in the management server A101, the management server A 101 transmits migration judgment results to the management server B 111 (306).

The migration judgment results include information (for example, the migration destination is a server in the information processing site C) concerning the server to which the application is migrated. Here, when migration is required in both of the migration judgments performed by the management servers A 101 and B 111, the management server B 111 makes migration of the relevant application. When migration is rejected in both of the judgments, the management server B 111 does not indicate migration of the application. Here, the rejection of migration means that the application cannot be migrated or the case where the management server judges that quality of communication with terminal is reduced even if the application is migrated or the communication cost is increased.

Here, the management server B 111 transmits information that processing request information confirmation has been made to the server B112 (confirmation result transmission (307)). The server B 112 generates processing results corresponding to the transmitted processing request (308). The server B 112 transmits the generated processing results to the device 151 (309). Here, there is described that the processing result generation process (301 to 309) is performed after waiting until the confirmation result transmission (307) is completed after the server B 112 confirms the processing request, although the processing in 308 and 309 may be made asynchronously (in advance).

When "migration is required" in both of the migration judgments of the management servers A 101 and B 111, the management server B 111 and the server B 112 perform migration of the application in the procedure from AP migration generation 310 to migration completion notification 323 described from now. Here, description is made on the assumption that the management server A 101 or the management server B 111 decides that the migration destination of the application is the server in the information processing site C 120.

In the AP migration generation 310, the management server B 111 makes generation for migrating the application to the server in the information processing site C. As described above, the management server B 111 is previously notified from the management server A 101 that the migration destination of the application is the server in the information processing site C and the management server having jurisdiction is the management server C 121. The management server B 111 generates the application information for requiring the management server C 121 to migrate the application. The generated application information is transmitted to the management server C 121 (AP migration request (311)). The management server C 121 receives the AP migration request (311) and decides the server to which migration is made. In the decision, the management server C 121 judges resources and operation conditions containing memory capacity, CPU performance, storage capacity, classification of operable VM (virtual machine) and classification of operable application in the servers managed by the management server C 121 in the information processing site C 120 from information of the application included in the AP migration request and selects the servers operable in all conditions.

Here, referring to FIG. 11, a management table in which information used in case where the management server C 121 judges to select the server to which the application is migrated in the information processing site C is managed is described. FIG. 11 shows the management table 1100 for managing the resources and the operation conditions for operating the application in the server managed by the management server C 121. The management table 1100 is recorded in the memory or storage in the management server C 121 and always updated by management table management function of the management server C 121. The management table management function manages objects to be managed by the management server C 121 and resources and information described later of the server in the information processing site C and makes allotment of resources to application execution request from other management server.

The management table 1100 describes therein server ID 1101, server name 1102, address 1103, allocatable memory amount 1104, allocatable storage amount 1105, CPU information 1106, operable VM classification 1107, operable application classification 1108, operation application information 1109, application operation results 1110 and cost 1111. The management table 1100 is shared in the information processing site by communication between the management servers in the site and updated at any time.

The server ID 1101 and the server name 1102 are ID and name given to the server managed by the management server C 121, respectively. The address 1103 records therein network address given to each server. The allocatable memory amount 1104 and the allocatable storage amount 1105 show remaining resources of unoccupied memory and unoccupied capacity of the storage in which migration of the application can be received. The unoccupied resource amounts are always updated by issuing a request to each server managed by the management server C 121. The management server compares the unoccupied resource amounts and makes allotment of resources.

The CPU information 1106 is specification information of the CPU included in each server and records therein operation frequency, the number of sockets and the number of cores. The operable VM classification 1107 and the operable application classification 1108 record therein classifications of VM operable in the server and application containing version, respectively. Whether necessary libraries which have dependency are installed is examined when the application is operated and is recorded. The operation application information 1109 is information of the application operating currently. The application operation results 1110 describe therein what operation results of application exist in the relevant server.

The cost 1111 is an index of cost per unit time obtained by multiplying the cost relative to utilization of the server and born by the user such as cost of electric power and rent for space born by the user when the server and the storage are utilized by the number of servers or the number of CPU's or the number of cores of CPU or storage capacity.

When the management server B 111 notifies the address and the specification information of the server necessary for migration to the management server C 121, the management server C 122 selects the server which can be operated under the notified conditions. In this selection, the allocatable memory amount 1104, the allocatable storage amount 1105 and the CPU information 1106 are referred to and the servers which can secure the necessary resources are selected. When the server in which the application requested before is operated is contained in the selected servers, the management server C 121 selects the server.

When there is no server in which the requested application is operated, the application operation results 1110 are referred to give preference to the servers having the operation results among the selected servers and the server satisfying the conditions described in the operable VM classification 1107 or the application classification 1108 and having the smallest cost described in the cost 1111 (total amount of costs in case of plural servers) is selected.

The application is migrated to the server selected by the management server C 121 as described above to thereby make it possible to provide the service having satisfactory response quality and low cost to the device 151.

Next, the method of making judgment of migration as to whether the application for performing information processing requested from the device 151 operating in the server B 112 is operated in other server except the server B 112 or not as described before is described.

The manager of the management servers B 111 and A 101 decides the policy for delivery of the information processing in case where the device 151 performs the specific information processing previously and stores it in the management server A 101 to be shared by the management servers. The management server A 101 responds to an inquiry of the management server B 111 to return the policy thereto for sharing of the policy. The policy defines allowable response time, allowable distance and the number of allowable network devices in communication for each combination of the device 151 and the contents of the information processing.

The management server B 111 investigates the contents of the response time contained in the request when the allowable response time is contained in the policy and judges that migration of the application and the data is required when it is judged that migration of the application and the data is required in the policy. For example, when a maximum value of the allowable position information is contained in the policy, the management server B 111 calculates the position information of the device contained in the request in step 302 and the magnitude of distance of the information processing site B and when it is judged that migration of the application and the data is required, the management server B 112 judges that migration of the application and the data is required.

For example, when the maximum value of the allowable passing network devices (the number of hops) is contained in the policy, the management server B 111 calculates the magnitude of the passing network devices (the number of hops) from the path information of the devices contained in the request in step 302 and when it is judged that migration of the application and the data is required, the management server B 111 judges that migration of the application and the data is required.

When the above judgment is made in the management server B 111, the management server A 101 makes the same judgment. When both of the management servers B 111 and A 101 judge that migration is required, the management server A 101 examines the information processing site of the migration destination. The management server A 101 obtains position, path and device information of the device 151 in step 305. The management server A 101 selects the information processing site in which the quality is improved in the information processing of the device 151 by migration as compared with the information processing site B 110 and transmits it to the management server B 111 in step 306.

When "migration is required" in both of the migration judgments of the management servers A 101 and B 111 described above, the management server B 111, the server B 112 and the management server and the server in the migration destination make migration of the application in the procedure from AP migration generation 310 to migration completion notification 323 described from now. Here, description is made on the assumption that the management server A 101 or B 111 decides that the migration destination of the application and the data is the server in the information processing site C.

Here, the management server C 121 decides the server which operates the application from the servers to be managed by the management server C 121 with reference to the management table 1000. First, the resource use information concerning the memory and storage of the application obtained from the management servers A 101 and B 111 and the resource use amount concerning the storage of the data are confirmed and the server satisfying the conditions of the data storage and the application is selected.

Further, when the application to be delivered has the application format, operable AP classification is confirmed and operable server is selected. The server which already has operation results is given preference and when the application is being operated actually at present, migration of the application is not made and only the data is migrated.

In the delivery of the application, there is described that packaged application is generated to be transmitted to the execution application and executed, although a virtual machine (VM) may be generated and transmitted by the execution server to be operated so that the application may be executed. In the following description, the former example is shown.

In the embodiment, the following description is made on the assumption that the management server C 121 decides that the server to which the application and the data are migrated is the server C 122. The management server C 121 transmits the address and the specification information (migration information) of the server C 122 for migration to the management server B 111 (312). The migration information contains authentication information for receiving the application. The management server B 111 transmits the received migration information to the server B 112. Then, the server B 112 transmits the migration information containing the authentication information to the server B 112 (314).

The server C 122 receives a migration reception request (313) from the management server C 121 beforehand. When the server B 112 receives the migration information, the server B 112 transmits the authentication information contained in the migration information to the server C 122 and starts communication with the server C 122. The server C 122 confirms the authentication information received from the migration reception request 313 and the transmitted authentication information and when the server C 122 confirms that the communication party is the server B 112, the server C 122 receives the application package for operating the received application program in the server C 122 and the data (315, 316) and stores the application and the data so that the application is operated in the server C 122 (317).

The storing of the application and the data means to make installation of the server application and Web application in the server C 122, setting to application, setting of environment and storing of user data so that the application operating in the server B 112 is operated in the server C 122. Information necessary for storing of the application and the data is transmitted to the server C 122 by the server B 112 in steps of AP migration 315 and data transmission 316.

Here, in steps of AP migration 315 and data transmission 316, there is described that the server B 112 directly transmits information to the server C 122. There is a case where communication from the server B 112 to the server C 122 is not made directly according to environments of the information processing sites B 110 and C 120. In this case, in the steps of AP migration 315 and data transmission 316, one or both of the servers B 112 and C 122 use a communication path for control to make communication between the servers B 112 and C 122.

Data concerning the device 151 is transmitted to the server C 122 in response to migration of the application. The server C 122 stores the data concerning the device 151 in the storage of the server C 122 or the storage 113 and the data concerning the device 151 is enabled to be utilized from the application operating in step 317 so that the application is executed (317). When it is necessary to deploy middleware such as DBMS for utilization of the data concerning the device 151, the management server C 121 instructs the server C 122 to be operated in the server C 122.

When the storing of the application is completed, the server C 122 notifies the completion of storing to the management server C 121 (318). The management server C 121 updates the management table 1101 provided in the management server C 121 itself. The management server B 111 transmits migration completion processing requests to the server B 112 and the management server A 101 (320, 321).

In migration completion processing 322, the management servers A 101 and B 111 instruct any one or more related devices of load balancer, DNS server and network device to change setting so that the processing request from the device 151 is processed by the server C 122. For example, a request for requiring change of information for name solution corresponding to the information processing is issued to the DNS server. The access path from the device 151 to the application is changed by the migration completion processing 322 to reach the server C 122. The server B 112 notifies to the server C 122 that the migration completion processing is completed and ends communication between the servers B 112 and C 122 for migration (323).

The management servers A 101, B 111 and C 121 cooperate with one another by executing the above procedures, so that the application operating in the server B 112 can be executed by the server C 122 using the position, path and device information 100 transmitted by the device 151 without deteriorating the response quality in case where the information processing results are received from the server by the device 151, so that the cost for performing the information processing can be reduced.

In the above procedure, the management server B 111 in the information processing site B 110 migrates the application in the server B 112 to the information processing site C 120, although since the information processing sites B 110, C 120 and D 130 have the same function, migration of the application and the data can be made between the sites similarly. Further, the information processing site E 140 has the network connection different from other sites, although the management server E 141, the server E 142 and the storage 143 in the information processing site E 140 have the same function as the management server B 111, the server B 112 and the storage 113 in the information processing site B 110 and accordingly same migration can be made.

However, the management server E 141 does not communicate with the management server A 101 directly and receives management instructions such as permission of migration to the management server C 121 which manages the management server E 141. The management server C 121 makes communication with the management server A 101 which is the higher rank management server so as to receive the management instructions if necessary.

Figures 12, 13:
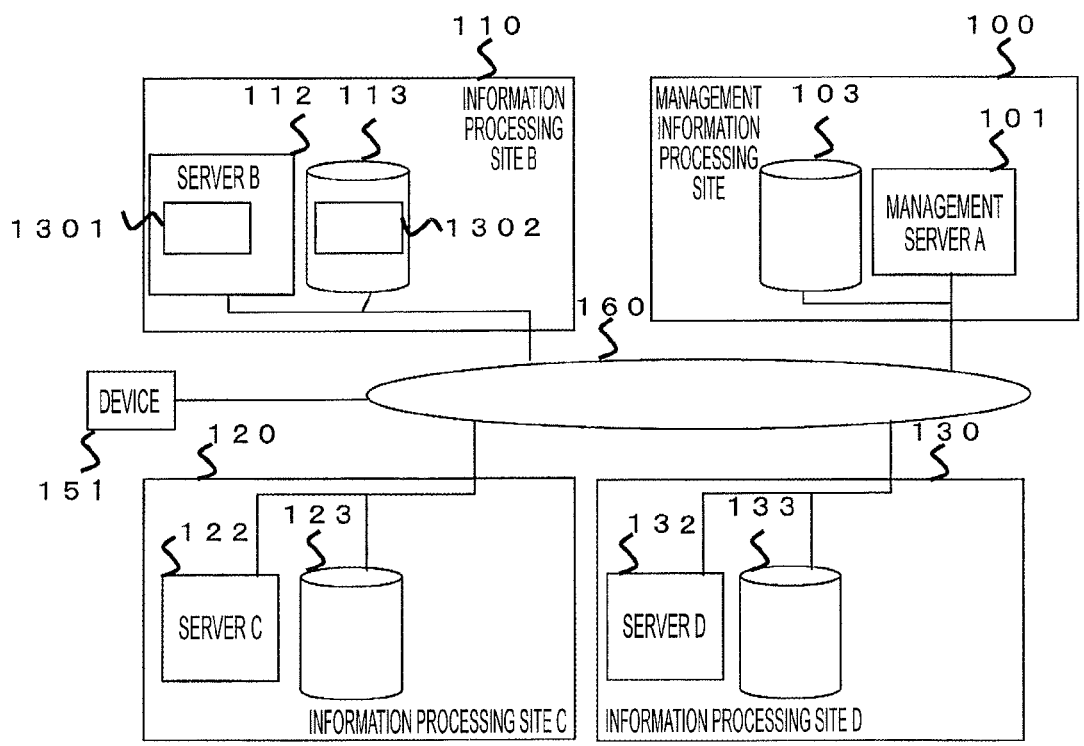
FIG. 12 is a diagram illustrating a service information table in the information processing system of the first embodiment.
FIG. 13 is a first diagram illustrating change of information processing sites to which application and data are delivered in the information processing system of the first embodiment.

Here, the method of judging migration as to whether the application for performing the information processing requested by the device 151 is operated in other server except the server B 112 or not is described in detail. FIG. 12 is a diagram explaining a service information table 1200 utilized in judgment of migration of the application in detail. The service information table 1200 records therein application ID 1201, application name 1202, delivery destination 1203, operation situation 1204, utilization device 1205 and delivery condition 1206.

The management server A 101 manages the operation applications and the operation conditions in the management server B 111 managed by the management server A 101 and the servers (servers B 112, C 122 and D 132) managed by the management servers C 121 and D 131 in the service information table 1200. The service information table 1200 is stored in the storage or the storage 103 and read out into the memory 202 to be updated and managed. The application ID 1201 records therein ID of application and is set uniquely for each application. The application name 1202 records therein name and size of application and preservation path of execution file and package. The delivery destination 1203 records therein which server the application is delivered and operation situation 1204 records therein information indicating which server the application is operated in the information processing site.

The utilization device 1205 records therein a list of utilization devices utilizing the delivered application. The delivery destination 1203 and the operation situation 1204 are set in a corresponding manner to each utilization device 1205. The delivery condition 1206 records therein conditions (operating OS in server, program and library having necessary dependence relation, necessary resources (memory, storage and network) and the like) required when the application is migrated to the server in the information processing site. The management server A 101 refers to the service information table 1200 when migration is judged and judges whether migration of the application is required. First, the management server A 101 investigates the information processing site in which the utilization device and the application are operated from the application ID 1201, the operation situation 1204 and the utilization device 1205.

The position information is used from among the position, path and device information 1004 transmitted previously from the device 151 to the management server A 101 to calculate a list of distances between the information processing site in which the application is operated and the information processing site B 110 in which the device 151 utilizes the application at present. An information processing site (site C in this case) having the shortest distance among them is calculated and when a difference between the site B 110 utilizing the application at present and the shortest distance is larger than or equal to a predetermined value or a ratio between the distances is smaller than a predetermined value, migration can be made and the judgment results that the migration destination is the information processing site C 120 are generated.

When the information processing site in which the application is being operated cannot be selected in the above procedure, the information processing sites in which the application is not operated and which satisfy the conditions described in the delivery condition 1206 are selected and the position information is used to calculate a list of distances between the selected information processing sites and the information processing site B 110 in which the device 151 utilizes the application at present. An information processing site (site C 120 in this case) having the shortest distance among them is calculated and when a difference between the site B utilized by the application at present and the shortest distance is larger than or equal to a predetermined value or a ratio between the distances is smaller than a predetermined value, migration can be made and the judgment results that the migration destination is the information processing site C 120 are generated. The above description is made to the judgment method of the information processing site utilizing the position information, although the round trip time RTT (response time) between the information processing sites or the number of router hops contained in the path information and the device information may be utilized in addition to the position information. In this case, when the response time or the number of router hops is improved more than a predetermined difference or ratio, the migration can be made and the information processing site is selected.

Further, data utilized by the application is distributed in storages in plural information processing sites. The distribution method is described later. In selection of the information processing site, the information processing sites in which replication of data utilized by the application from the device 151 is present are given preference for calculation using distance and path. When the information processing site in which the replication of data is present is nearer to the device 151 in distance as compared with the information processing site B 110, the information processing site in which the replication of data is present is given preference and the application is migrated thereto.

In this case, since migration of data is not required, transmission of data in step 316 is not made. Deletion of data and stop of application in the migration completion processing of step 322 are not also made.

As described above, the management server A 101 selects the information processing site in which the application can be operated from among the information processing sites in which the management servers unified by the management server A 101 are installed and notifies it to the management server B 111 together with the judgment results.

In FIG. 3, when the step of the migration completion notification 323 is ended, generation made in the server C 122 of the information processing site C 120 is completed for execution of the application in the device 151. Thereafter, when the device 151 generates (301) a request of information processing desired to make the information processing apparatus (server) perform and transmits the information processing request to the server C 122, the procedures from the above processing request confirmation (303) to the processing result transmission (308) are performed by the management server C 121, the server C 122 and the management server A 101 and accordingly the device 151 can continue the information processing continuously.

Next, the method of multiplexing the data concerning the device 151 by the information processing system of the embodiment to improve the availability is described. Management of the replication of the data is made by making communication by the distribution data control part 405 between the servers. First, when the data concerning the device 151 is generated in the storage 113 of the information of the information processing site B 110, the distribution data control part 405 in the server 112 of the information processing site B 110 makes inquiries to the management server B 121 and decides the creation destination (delivery destination) of the replication of the data concerning the device 151. The distribution data control part 405 transmits the data to the delivery destination. In the selection of the delivery destination, the delivery destination in the information processing site is decided by the management server B 111. The creation destination of the replication of the data is previously decided and the data having the replication takes over the replication destination of the data. Accordingly, the replication of data for a new information processing site is not formed.

The delivery (replication) destination of the data outside of the information processing site is decided by making inquiries to the management server A 101 by the management server B 111. The management server B 111 provides information about the policy as to how the availability of the data concerning the device 151 is required to be kept from the management server A 101 (step 306). The policy is defined so that one replication is contained in the same information processing site and two replications are contained outside of the information processing site, for example. When the replication is generated outside of the information processing site, the management servers A 101 and B 111 both include an area information management table described later and decide the delivery destination satisfying the conditions.

FIG. 9 is a diagram explaining an information processing site information management table. The site information management table 900 describes therein position information of each information processing site and the like. The table 900 describes therein any one or more kinds of information processing site ID 901, information processing site name 902, information processing site position (latitude and longitude) 903, connection network information 904, information processing site form 905, security level 906 of site and risk 907 in disaster and power failure in site. The site information management table 900 is managed by the management server A 101 and is shared with the management servers such as the management server B 111.

The management server B 111 makes inquiries to the management server A 101 in order to decide to what degree the replication of the data concerning the device 151 is generated. The management server A 101 transmits instructions for redundancy of the data in the storage in accordance with the policy decided by the owner of the device 151 previously. The policy is defined, for example, so that "two replications of data are always included and one of them is generated in the same information processing site, the other being generated in the information processing site 100 Km or more distant therefrom".

In this case, the management server B 111 judges the distance from the information processing site ID 901, the information processing site position 903 and the like of the site information management table and decides the information processing site in which the replication of the data is generated. For example, when the policy is defined so that "the replication of the data is generated in three different information processing sites in the connection network", the management server B 111 judges the connection network from the connection network information 904 of the site information management table and decides the information processing site. Further, for example, when the policy is defined so that "the replication of the data is generated in three information processing sites in which any one or more kinds of the information processing site form, the security level and the risk in disaster and power failure showing the grade of the information processing site have a fixed value or more", the management server B 111 selects and decides the information processing sites from any one or more kinds of the information processing site form 905, the security level 906 of the information processing site and the risk 907 in disaster and power failure in the information processing site of the site information management table and the values thereof.

For example, when the policy is defined so that "one replication of the data is always provided and is generated in the information processing site in which the application referring to the data is operated", the management server B 111 investigates the operation application information 1109 and decides the information processing site in which the application is operated as the information processing site in which the replication is generated.

When the classifications of application are divided to be managed for each user and utilization apparatus, the application is operated in the information processing site near from the utilization apparatus physically or the information processing site having short response in the network to the utilization apparatus each time the application is utilized by the user.

When the system of the embodiment continues operation, the replication of certain data is generated in the same information processing site in accordance with the policy decided once, although when the information processing site is "the information processing site in which the application referring to the data is operated" as described above, the information processing site in which the application is operated is frequently migrated. In this case, the management server B 111 changes the information processing site of the generation destination of the replication to the information processing site in which the application is operated. The data in the former information processing site of the generation destination of the replication is deleted and the replication is generated in the information processing site selected newly.

As described above, the generation destination of the replication is changed, so that when there are plural applications for generating or making reference to or updating data or plural apparatuses utilizing the applications, the application can be performed in the information processing site having satisfactory response performance and throughput for the user and the utilization apparatus using the application and the data and the replication of the data are generated in the information processing site. Accordingly, the utilization efficiency of the application including the processing time of the application is improved and the quality of experience of the user utilizing the application is improved effectively.

In the following description, it is supposed that the polity that "two replications of data are always included and one of them is generated in the same information processing site, the other being generated in the information processing site 100 Km or more distant therefrom" is set for the data concerning the device 151.

The distribution data control part 405 is operated to generate the replication of data concerning the device 151 in the information processing site and the information processing site D 130 apart from 100 Km or more distant therefrom in accordance with instructions of the management server B 111. The distribution data control part 405 connects the storage 113 instructed by the management server B 111 with the distribution data control part 405 in the server of the information processing site D 130 and generates the replication of the data concerning the device 151. Each time the data concerning the device 151 is updated, the distribution data control part 405 updates the replication.

Here, description has been made so that the distribution data control part 405 generates the replication of the data, although redundancy that the congregation of data and parity such as distributed data and guarding is shared by some storages may be made instead of generating the replication that is a copy (backup) of the data.

Next, referring to FIGS. 13 to 16, the procedure for migrating the application and the data between the information processing sites and replicating them when the devices 151 and 152 utilize the application and the data through the access network not shown and the core network 160 is described.

Figure 14:
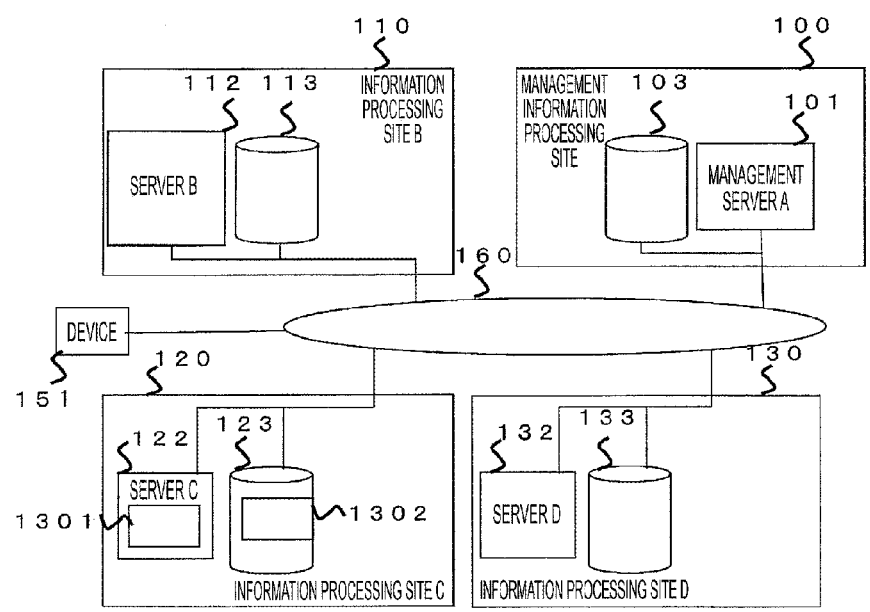
FIG. 14 is a second diagram illustrating change of information processing sites to which application and data are delivered in the information processing system of the first embodiment.

As shown in FIG. 13, it is supposed that the application 1301 and the data 1302 utilized by the device 151 are operated in the server B 112 and are stored in a storage 1303. The application 1301 is migrated from the server B 112 to the server C 122 in step 315 and the data 1302 is migrated from the storage 113 to the storage 123 in step 316 by the movement step of the information processing sites of the application and the data described above. In the migration completion processing 332, the application 1301 in the server B 112 is stopped and the data 1302 is deleted (FIG. 14).

Figure 15:
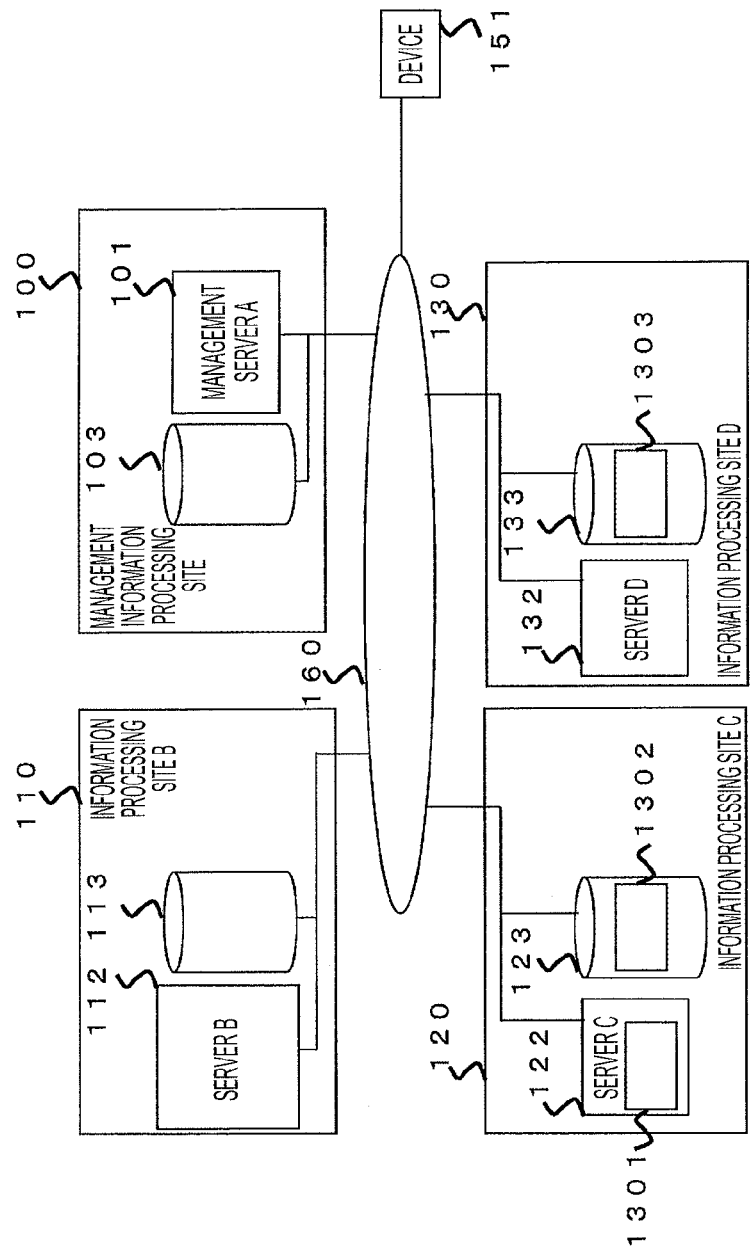
FIG. 15 is a third diagram illustrating change of information processing sites to which application and data are delivered in the information processing system of the first embodiment.

Here, when it is supposed that the replication of the data is generated in the information processing site D 130, the management server D 131 instructs to generate the replication 1303 of the data in the storage 133 as shown in FIG. 15. Thereafter, when the device 151 is migrated and the position or the address in the network of the device 151 are changed, the migration destination of the application 1301 operating in the server C 122 is judged in the management server C 121. In this case, the replication of the data is previously stored in the storage of the information processing site D 130 and the management server C 121 selects the information processing site D 130 as the migration destination of the application preferentially. At this time, the migration of the application described before is made, although migration of the data is not required and accordingly migration of the data in step 316 is not made. Further, deletion of the data in the migration completion processing of step 322 is not made.

Figure 16:
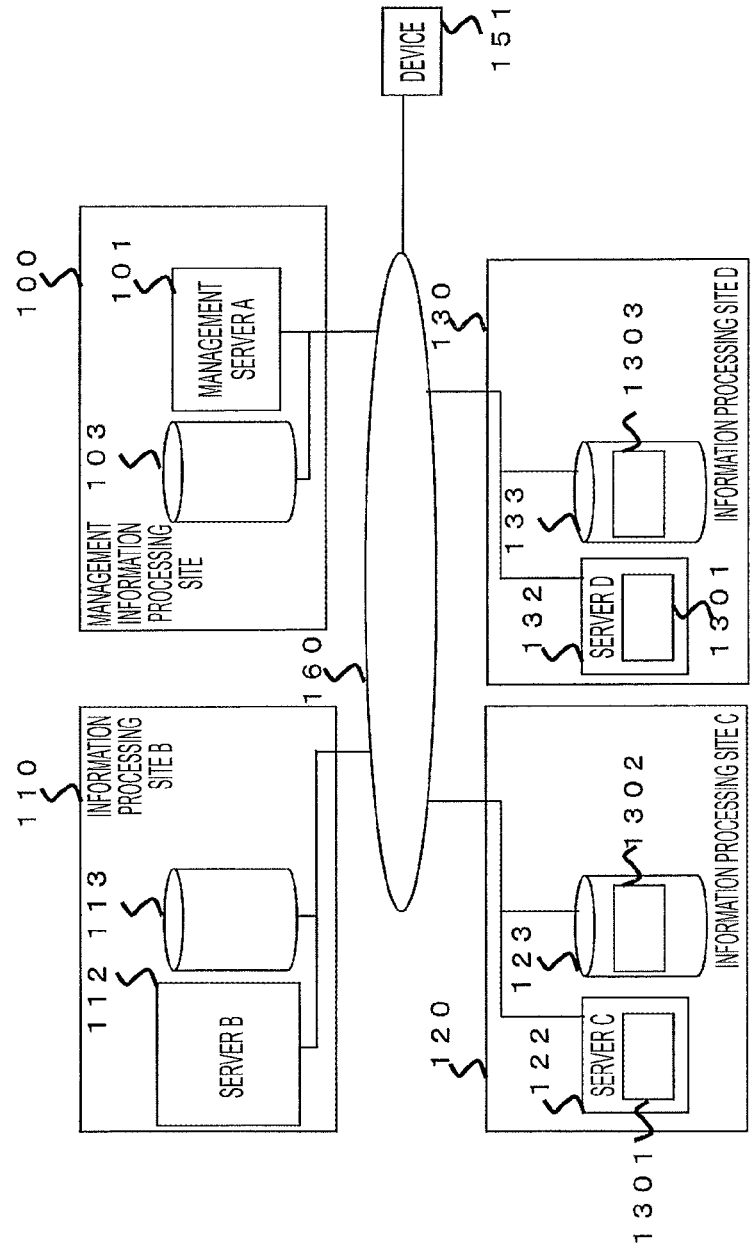
FIG. 16 is a fourth diagram illustrating change of information processing sites to which application and data are delivered in the information processing system of the first embodiment.

When migration of the application is made as described above, the application 1301 is operated in the information processing sites C 120 and D 130 and the data 1302 and the replication 1303 of the data are delivered in the information processing sites C 120 and D 130, respectively, as shown in FIG. 16. When the position of the device 151 is nearer to the information processing site C 120 as compared with the information processing site D 130 or the distance in the network from the device 151 to the information processing site C 120 is nearer as compared with the information processing site D 130, the application and the data utilized from the device 151 are the application 1301 and the data 1302. Further, when the position of the device 151 is nearer to the information processing site D 130 as compared with the information processing site C 120 or the distance in the network from the device 151 to the information processing site D 130 is nearer as compared with the information processing site C 120, the application and the data utilized from the device 151 are the application 1301 and the replication 1303 of the data.

Here, when the replication 1303 of the data is updated from the device 151 through the application 1301, the distribution data control part 405 in the server shares the updated information added to the replication 1303 of the data and reflects the updated information on the data 1302.

Even when the device 151 utilizes any application 1301 in the servers C 122 and D 132, the data can be utilized through the same application by reflection of the update, so that the response performance of the application and the speed of reference and recording (update) of the data can be improved effectively.

In the foregoing description, migration of the data and the application and generation of the replication of the data are made depending on the device 151, although the devices may be grouped and managed for each user. By doing so, even if the device utilized by the user is the device 152 instead of the device 151 in the example shown in FIG. 16, the same effects can be obtained. Thus, sensor information generated by the device 152 can be added to the data 1303 through the application 1301 and the data can be accessed through the application 1301 when the device 152 refers to the added data. By doing so, the response performance of the application from the device 152 can be improved effectively and the speed of reference to the data can be improved.

Management of the device for each user is realized by grouping the utilization devices in accordance with the user in the utilization devices 1205 of the service information table 1200. For example, when the user utilizing the devices 151 and 152 is the same, the devices 151 and 152 in the utilization devices 1205 of the service information table 1200 are regarded as being the same.

As described above, the devices such as terminals of the user cooperate with the servers and the management servers installed in the information processing sites and the applications which generate dynamic creation results are migrated from the central data center in which the original server operating originally is provided to the data center of distributed terminals, so that the load applied to the network access in the central data center can be reduced.

Thus, the information processing system of the embodiment can reduce the cost of the data center and can reduce the cost born by the user utilizing the devices and the information processing using the application and the data in the data center effectively.

Further, when the information processing system of the embodiment is applied to the information processing system requiring different information processing every time, the information processing system of the embodiment is effective and can reduce the cost for maintenance of the line quality. Since the information processing system of the embodiment performs the dynamic creation processing previously and delivers the application instead of the method of delivering the application in the delivery point, the problem that a large number of data are generated by delivery and the storages are consumed to increase the cost can be also solved.

In the information processing system of the embodiment, when the device is a terminal device such as, for example, a car navigator, a PC and a portable phone carried by the user, the application which is performed in the information processing site (data center) existing in a position near to the user physically or a position near to the user in the network is deployed as the application utilized by the user. Accordingly, the problem that the processing is concentrated in one information processing site (data center) and the response time of the application in case where the application to the user utilizing the terminal device is executed and the time for transmission and reception of data are made longer can be solved and the quality of experience of the user upon utilization of the system can be improved.

Further, the above device is frequently moved to be utilized, although even if the device is moved, the information processing site in which the quality of experience of the user can be enhanced is selected as the information processing site (data center) in which the application and the data are deployed by utilizing the position information, the path information and the device information transmitted from the device to the server or the management server by the management server.

Further, when the device is a control apparatus such as a sensor containing a measuring instrument such as a meter device, a thermometer and a wattmeter, a people flow analyzer, a monitoring camera, an authentication devices and the like, the application executed in the information processing site (data center) existing near to the sensor physically or in the network is deployed as the application which receives the request from the sensor or the control apparatus to be operated.

Accordingly, concentration of data and processing on one information processing site (data center), shortage of network band in the information processing site (data center) and stagnation of information processing to the request from the sensor or the control apparatus are dissolved and the provider utilizing the sensor or the control apparatus to perform information processing can eliminate the necessity of reinforcing the equipment in the information processing site (data center) and the necessity of bearing the additional cost for shortage of the band effectively.

Further, for example, when the information processing site is an RSU and the device is an onboard apparatus, the processing request containing any one or more kinds of position information, operation information, fuel consumption information and the like transmitted from the onboard apparatus to obtain information from the data center and the processing request containing any one or more kinds of image, voice, measurement results such as temperature and the like provided in the onboard apparatus are transmitted to the RSU and are subjected to information processing in the information processing site or the information stored in the RSU is processed in the RSU to be displayed in the onboard apparatus. When the delivery method described in the embodiment is utilized, the information processing is performed in the information processing site in which the physical distance to the onboard apparatus is short or in the information processing site in which communication delay in the network is small and accordingly the information processing results are displayed in the onboard apparatus rapidly and the quality of experience of the user is enhanced.

When the communication distance between the RSU and the onboard apparatus is short, the time taken to perform the information processing is short and accordingly the speed of the vehicle in which the treatable onboard apparatus is mounted can be improved and an amount of information to be transmitted can be increased. Further, the proportion of concentration of data and processing on one information processing site (data center), shortage of network band in the information processing site (data center) and stagnation of information processing to the request from the onboard apparatus in case where information transmitted to the information processing site by the onboard apparatus is increased is reduced and the provider utilizing the sensor and the control apparatus to perform the information processing can eliminate the necessity of reinforcing the equipment in the information processing site (data center) and the necessity of bearing the additional cost for shortage of the band effectively.

Further, for example, when the information processing site is a relay equipment of network transmission for a monitoring camera and the device is the monitoring camera, information of image and voice transmitted from the monitoring camera is subjected to the information processing in the information processing site having physical distance near to the installation position of the monitoring camera or in the information processing site in which communication delay in the network is small in accordance with the delivery method described in the embodiment. Moreover, when another apparatus such as PC for confirming the results monitored by the monitoring camera is provided, the replication of the monitored results by the monitoring camera is generated in the information processing site having the physical distance near to another apparatus and in the information processing site in which the communication delay in the network is small.

Accordingly, since the processing time in the case where the above other apparatus refers to the monitored results is shortened, the quality of experience of the user is improved. Since the information processing site in which the replication is generated is installed in the information processing site having the physical distance near from the apparatus (monitoring camera) which generates the monitored results, the information processing site in which communication delay in the network is small or the information processing site having the physical distance near to the other apparatus, the efficient replication of data can be realized and the necessity that the provider bears the cost for increasing the storage capacity in the information processing site is reduced as a whole system.

Next, a second embodiment is described with reference to the drawings. The information processing system shown in the second embodiment is the same as the information processing system shown in the first embodiment, although the information processing system of the second embodiment is different in that distributed metadata of "data concerning apparatuses" is collected by the management server A 101 and stored in the storage 103.

Figure 5:
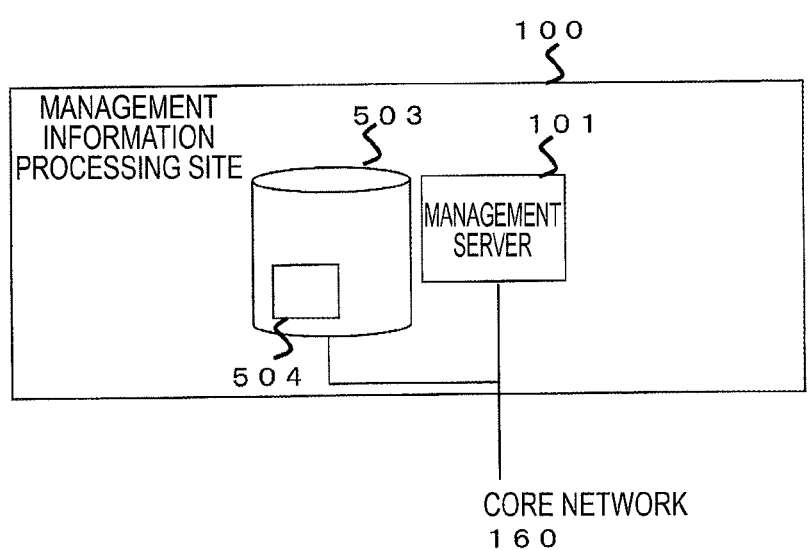
FIG. 5 is a diagram illustrating metadata stored in a storage in the information processing system of a second embodiment.

FIG. 5 is a diagram schematically illustrating the management server A 101 and a storage 503 in the information system of the second embodiment. The management server A 101 manages metadata of data stored in the storage managed by the management server managed by the management server A 101 in the storage 503 and stores the metadata. Management of the metadata is made by the metadata management part 403.

The metadata means abstracted data of contents of data attendant on certain data. Mainly, the metadata is utilized as a measure for understanding contents and property of data at high speed without retrieving the data itself. FIG. 6 shows detailed metadata accumulated in the storage 503 of the management server A 101 to be utilized. Elements forming the metadata 600 include any one or more kinds of name 601, ID 602, size 603, path name 604, replication 605, owner 606, permission 607, utilized application 608 and other parameter 609 of file objects as shown in FIG. 6.

The name 601 of file object is the name of file object. The ID 602 is ID given to the file object uniquely. The size 603 is the size of the file object. The path name 604 is access information of the file object for accessing a server and a file such as directory stored. The replication 605 indicates the number of replications of the file object generated and the location where the replications are stored.

The owner 606 is an identifier of a user generating the file object and having the right to change, migrate and delete the file object. The permission 607 is information indicating what access right to the file object is possessed by the owner of the file object or other users. The utilized application 608 is classification, ID and version information of the application in the server utilizing the file object. Other parameter 609 is information depending on the classification of the file object and accompanying data.

For example, when the classification of the data is image, the metadata contains any one or more kinds of date and time of generation, position information, camera parameter, thumbnail and the like as elements. Further, for example, when the classification of the data is document, the metadata contains any one or more kinds of size, number of pages, number of characters, title and the like as elements. In addition, for example, when the classification of the data is animation, the metadata contains any one or more kinds of frame rate, bit data, size, ID of codec and the like as elements. Moreover, the metadata contains any one or more kinds of location, size and path name of file, file name, keyword, date and time of update, classification of file, copyright information, author, rating, access permission, comment and the like as elements irrespective of the classification of data. Further, for example, analysis results of data contents, index information for retrieval and the like may be contained as elements of the metadata.

When data is written in the storage (any one of storages 113, 123, 133 and 143) in the information processing site in which the management server is installed and which is managed by the management server itself, the management server in the information processing sites B to D obtains the metadata of the data and transmits the metadata to the management server A 101 by the method described later. The management server A 101 records the metadata 504 in the storage 103.

The servers (servers B 112, C 122 and D 132) in the information processing sites B to D include the distribution data control part 405 for accessing the storages (storages 113, 123 and 133) in the information processing sites in which the servers are installed. Data in the storages 113, 123 and 133 are accessed by an access request to the data in the storage from the application executed in the servers B 1142, C 1242 and D 132 and the data are generated, updated, added, deleted and the like.

The data management parts 405 make communication mutually and make generation, update, addition, deletion and the like to the data in the storages 113, 123 and 133 in accordance with instructions of the management servers B 111, C 121 and D 131. When the generation, update, addition and deletion to the data in the storages 113, 123 and 133 are made, the metadata management parts 403 generate the metadata of the data object and transmit the metadata to the management servers in the information processing sites.

The metadata obtained by the management servers (111, 121 and 131) is transmitted to the management server A 101 and is managed (metadata 304 is added upon generation, updated upon update and addition and deleted upon deletion) in the storage 103 for each file object.

It is supposed that the device 151 utilizes the application operating in the server B 112 and performs information processing now. In this case, the data referred to and generated by the application in the server B 112 is read in or recorded in the storage 113 via the distribution data control part 405. At this time, the distribution data control part 405 communicates with the data control part in other communicable servers and generates replications of data of the predetermined number. The generation of the replication is made in order to enhance the availability and disaster-resistant characteristic of the data.

The distribution data control part 405 makes generation, update and deletion of the data while generating the replications of the predetermined number in the recording destination of the replications decided by the management server B 111.

The management server A 101 manages that the data related to a certain device (data utilized in information processing by the device) and the replication thereof are stored in the storage of which information processing site by the metadata 504. When the management server A 101 selects the information processing site in which the application is operated in step of migration judgment 304, the management server A 101 gives preference to the information processing site in which the data is recorded and next gives preference to the information processing site in which the replication of the data is recorded. The above judgment can suppress migration between the information processing sites of the data related to the certain device and reduce the cost born by the provider utilizing the device.

Figure 7:
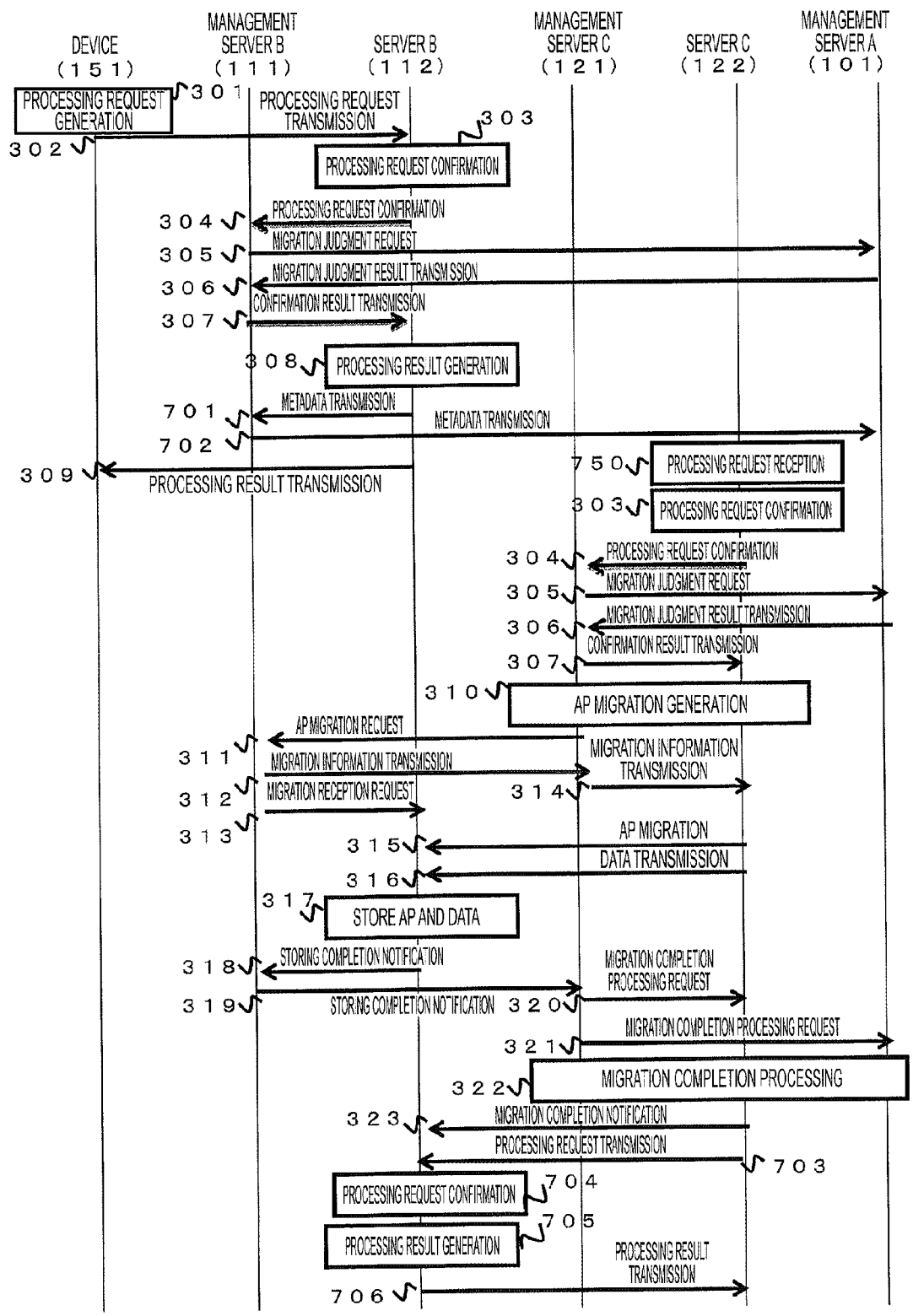
FIG. 7 is a sequence diagram illustrating operation at the time that application and data are migrated to distributed information processing apparatuses in the information processing system of the second embodiment.

In the following description, the method of managing the data and the metadata by the information processing system of the embodiment is described concretely by taking the information processing in which the data from a sensor is stored in the server and the operation processing is performed as an example. FIG. 7 is a sequence diagram in case where the device such as a sensor performs the information processing accompanying transmission of data to the server in the information processing system of the embodiment.

The device 151 has the sensor function and the role of recording information obtained by a sensor part into the server or the storage 113 which is a recording area of the server in the information processing site B. The device 151 generates an information processing request desired to make the server B 112 perform (301). The information processing request is instruction of recording measurement data such as measured temperature and power consumption, recorded voice and image and the like and the contents thereof since the device 151 is a sensor. In this example, the device 151 is described as being a wattmeter for measuring the power consumption.

The device 151 transmits the processing request to the server B 112 in processing request transmission (302) in order to make the server B 112 perform the information processing of the contents generated by the information processing request 301. Thereafter, the above processing request confirmation (304), the migration judgment request (305), the migration judgment result transmission (306) and the confirmation result transmission (307) are performed among the server B 112 and the management servers B 111 and A 101.

Next, the server B 112 creates information processing results, that is, performs processing (for example, calculation of the sum total or average of items and obtainment of charging information and statistical information from measured results) indicated to the data contained in the information processing request and stores measured data and processed data in the server B 112 or storage 113. Next, the server B 112 calculates the metadata for the measured data and the processed data stored and transmits the metadata to the management server A 101 through the management server B 111 (701, 702). The management server A 101 stores the received metadata in the storage 503.

Here, the server B 112 transmits the processing results from which the information as to success or failure as a result of recording the data is generated to the device 151 (309). In the above processing, if migration of the application for performing information processing is required, the application is migrated by the above procedure. The management server A 101 adds the received metadata to the metadata 504 to be updated and manages the metadata in the storage 103. The management server A 101 can grasp what exists as data in the storage of the information processing site and what incidental information is provided with reference to the metadata 504. Accordingly, when the request of the information processing for the data managed in other information processing sites is received from the user in the management information processing site, migration of the application described in the first embodiment can be utilized to thereby migrate the application to the place where the data exists and perform the information processing.

It is supposed that the request of the information processing for the data (hereinafter referred to data B) preserved in the storage 113 is transmitted to the server C 122 from another device (supposed as being the device 152) not shown in FIG. 7. In step 750, the server C 122 receives the processing request.

Here, the device 152 is the terminal which is utilized by the user and manages other sensors including the device 151 and which requests the server to perform the processing for unifying the information processing for collecting data from the devices containing the device 151. For example, the processing for the wattmeter is collection and indication of measured results and indication of charging information and statistical information calculated from collection results.

The server C 122 confirms the processing request (303). The server C 122 requests the management server B 111 to confirm the processing request (304). The step of the processing request confirmation 304 may be made every time when the processing request is transmitted from the device 152 or may be made only when the processing is made first within a predetermined period or may be made at the predetermined frequency within the predetermined period. In step of the processing request 303, when it is supposed that the processing request is the collection processing (for example, processing for calculating the average of the whole data (time series of power consumption) or for calculating the charging information from data (power consumption)) for the data B, the response (judgment results) of the management server A 101 to the migration judgment request 305 includes indication of migration of the application and the data so as to perform the application in the information processing site in which the data B is recorded.

The management servers C 121 and C 122 migrate the application in the procedure of AP migration generation 310 to migration completion notification 323. Here, description is made on the assumption that the management server A 101 or the management server B 111 decides that the migration destination of the application is the server in the information processing site B.

When the AP migration is ended in step 323, the server C 122 transmits the processing request received from the device 152 to the server B 112 (703) and makes confirmation of the processing request (704) and generation of the processing results (705). The generated processing results are transmitted from the server B 112 to the server C 122 in step 706. The server C 122 utilizes the received processing results and notifies the processing results to the device 152.

Here, there has been described that the device 152 requests the collection processing to the data B, although when the device 152 requests the collection processing to the plural data, the management server A 101 instructs the server C 1242 to migrate the applications for plural information processing sites and the plural applications are migrated. The plural processing results transmitted in step 706 are collected and accordingly the server C 1242 notifies the plural processing results to the device 152 as the final processing results.

By executing the processing as described above, the processing requested from the device can be executed in the server of the information processing site in which the data B is recorded and the processing results can be transmitted to the device.

As described above, since the data (data B) collected from the devices can be recorded in the information processing site near to the device and can be utilized in the information processing, concentration of the data communication in the specific information processing site such as the management information processing site 100 and the information processing site B 110 cannot occur and the information processing apparatuses in the information processing sites can be utilized effectively. Further, when the storage preservation cost in the specific information processing site such as the management information processing site 100 is high, the data collected from the devices can be recorded in the information processing site near to the device to thereby reduce the storage preservation cost for data recording.

REFERENCE SIGNS LIST

100: management information processing site, 101: management server A, 192: server A, 103: storage, 111: management server B, 112: server B, 113: storage, 121: management server C, 122: server C, 123: storage, 131: management server D, 132: server D, 133: storage, 141: management server E, 142: server E, 143: storage, 151-154: device, 160: core network, 151, 152: access network, 403: metadata management part, 405: distribution data control part, 503: storage, 504: metadata, 600: metadata, 900: information processing site information management table, 901: information processing site ID, 902: information processing site name, 903: information processing site position, 904: connection network information, 905: information processing site form, 906: security level, 907: power failure risk, 1100: management table, 1101: server ID, 1102: server name, 1103: address, 1104: possible memory amount, 1105: possible storage amount, 1106: CPU information, 1107: operable VM classification, 1108: operable application classification, 1109: operation application information, 1110: application operation results, 1111: cost, 1200: service information table, 1201: application ID, 1202: application name, 1203: delivery destination, 1204: operation situation, 1205: utilization device, and 1206: delivery condition.

The invention claimed is:

1. An information processing system, comprising:
a plurality of sites that are connected through a network, each site of the plurality of sites including:
an application server configured to execute an application;
a file server having storage to record data; and
a management server configured to manage the application servers and the file servers
a first management server of the management server at a first site of the plurality of sites configured to:
acquire position information of a device which gives an instruction to execute the application through the network;
decide a second application server of the application server at a second site of the plurality of sites to operate the application instead of a first application server of the application server which is executing the application based on position information of a plurality of application servers including the application server and the acquired position information of the device; and
transmit an instruction to a second management server of the management server which manages the second application server to migrate the application and data from the first application server to the second application server; and
the second management server configured to:
transmit information to specify the second application server of a migration destination to the first management server; and
transmit the instruction of migration to the second application server;
the first management server configured to transmit the information to specify the second application server of the migration destination to the first application server;
the second server configured to:
receive information used for executing the application and the data from the first application server;
execute the application; and
store the received data in a second file server of the file server at the second site;
the first management server configured to transmit an instruction to a network device for constituting the network so that an execution destination of the application instructed from the device is changed from the first application server to the second application server when the execution of the application and migration of the data in the second application server are completed.

2. The information processing system according to claim 1:
the first management server configured to transmit an instruction to migrate a second application to the second management server which manages the second application server when the first management server receives an instruction to execute the second application which performs operation processing for the data; and
the second application server configured to transmit operation results of the second application to which the data is inputted to the first server.

3. An information processing system comprising a plurality of sites that are connected through a network, each site of the plurality of sites including:
an application server configured to execute an application;
a file server having storage to record data; and
a management server configured to manage the application server and the file servers,
a first management server of the plural management server at a first site of the plurality of sites configured to:
acquire information of the network;
decide a second application server of the application server at a second site of the plurality of sites to operate the application instead of a first application server of the application server which is executing the application based on information of a number of hops in the network of the plurality of application servers including the application server and a device for instructing the execution of the application; and
transmit an instruction to a second management server of the management server which manages the second application server to migrate the application and data from the first application server to the second application server; and
the second management server configured to:

transmit information to specify the second application server of a migration destination to the first management server; and
transmit the instruction of migration to the second application server;
the first management server configured to transmit information to specify the second application server of the migration destination to the first application server;
the second application server configured to:
receive information to execute used for executing the application and the data from the first application server;
execute the application; and
store the received data in a second file server at the second site;
the first management server configured to transmit an instruction to a network device for constituting the network so that an execution destination of the application instructed from the device is changed from the first application server to the second application server when the execution of the application and migration of the data in the second application server are completed.

4. The information processing system according to claim 3,
the first management server configured to transmit an instruction to migrate a second application to the second management server which manages the second application server when the first management server receives an instruction to execute the second application which performs operation processing for the data; and
the second application server configured to transmit operation results of the second application to which the data is inputted to the first server.

5. A management server group configured to manage a plurality of application servers to execute each application and a plurality of file servers having storages to record data, which are connected through a network, the management server group comprising:
a first management server of the management server group configured to:
acquire position information of a device which transmits a request to execute the application;
decide a second application server of the application servers to operate the application instead of a first application server of the application servers which is executing the application based on a position information of the plurality of application servers included in the management server group and the acquired position information of the device; and
transmit an instruction to a second management server of the management server group which manages the second application server to migrate the application and data from the first application server to the second application server; and
the second management server configured to:
transmit information to specify the second application server to the first management server; and
transmit the instruction of migration to the second application server;
the first management server configured to transmit the information to specify the second application server to the first application server;
the second application server configured to:
receive information used for executing the application and the data from the first application server;
execute the application; and
store the received data in a second file server of the file servers;
the first management server configured to transmit an instruction to a network device for constituting the network so that a transmission destination of the request to execute the application transmitted from the device is changed from the first application server to the second application server when the execution of the application and migration of the data in the second application server are completed.

6. The management server group according to claim 5,
the first management server configured to transmit an instruction to migrate a second application to the second management server which manages the second application server when the first management server receives an instruction to execute the second application which performs operation processing for the data; and
the second application server configured to transmit operation results of the second application to which the data is inputted to the first server.

7. A management server group configured to manage a plurality of application servers to execute an application and a plurality of file servers having storages to record data, which are connected through a network, the management server group comprising:
a first management server of the management server group configure to:
acquire information of the network;
decide a second application server of the application servers to operate the application instead of a first application server of the application servers which is executing the application based on information of a number of hops in the network of the plurality of application servers and the device for instructing the execution of the application; and
transmit an instruction to a second management server of the management server group which manages the second application server to migrate the application and data from the first application server to the second application server; and
the second management server configured to:
transmit information to specify the second application server to the first management server; and
transmit the instruction of migration to the second application server;
the first management server configured to transmit information to specify the second application server to the first application server;
the second application server configured to:
receive information used for executing the application and the data from the first application server;
execute the application; and
store the received data in a second file server of the file servers;
the first management server configured to transmit an instruction to a network device for constituting the network so that a transmission destination of the request to execute the application transmitted from the device is changed from the first application server to the second application server when the execution of the application and migration of the data in the second application server are completed.

8. The management server group according to claim 7,
the first management server configured to transmit an instruction to migrate a second application to the second management server which manages the second application server when the first management server receives an instruction to execute the second application which performs operation processing for the data; and the second application server transmitting operation results of the second application to which the data is inputted to the first server.

9. A server management program for configuring a management server group executed by a plurality of computers, the management server group managing a plurality of file servers having storages to record data and a plurality of application servers to execute each application interconnected through a network, the server management program comprising, a non-transitory computer readable storage medium, the server management program comprising code for:

acquiring, via a first management server, position information of a device which transmits a request to execute the application;

deciding a second application server of the application servers to operate the application instead of a first application server of the application servers which is executing the application based on position information of the plurality of application servers included in the management server group and the acquired position information of the device; and transmitting an instruction to a second management server of the management server group which manages the second application server to migrate the application and data from the first application server to the second application server; and transmitting, via a second management server, information to specify the second application server to the first management server; and transmitting the instruction of migration to the second application server;

transmitting, via the first management server, the information to specify the second application server to the first application server;

receiving, via the second application server, information used for executing the application and the data from the first application server; executing the application; and storing the received data in a second file server of the file servers;

transmitting, via the first management server, an instruction to a network device for constituting the network so that a transmission destination of the request to execute the application transmitted from the device is changed from the first application server to the second application server when the execution of the application and migration of the data in the second application server are completed.

10. The server management program according to claim 9, further comprising code for:

the first management server, configured by the server management program, transmitting, via the first management server configured by the server management program, an instruction to migrate a second application to the second management server which manages the second application server when the first management server receives an instruction to execute the second application which performs operation processing for the data; and transmitting via the second application server configured by the server management program, operation results of the second application to which the data is inputted to the first server.

11. A server management program for configuring a management server group executed by a plurality of computers the management server group managing a plurality of file servers having storages to record data and a plurality of application servers to execute each application interconnected through a network, the server management program comprising, a non-transitory computer readable storage medium, the server management program comprising code for:

acquiring, by a first management server of the management server group, position information of a device which transmits a request to execute the application;

deciding a second application server of the application servers to operate the application instead of a first application server of the application servers which is executing the application based on position information of the plurality of application servers included in the management server group and the acquired position information of the device; and transmitting an instruction, to migrate the application and data from the first application server to the second application server, to a second management server of the management server group which manages the second application server; and transmitting, via the second management server, information to specify the second application server to the first management server; and transmitting the instruction of migration to the second application server;

transmitting, via the first management server, the information to specify the second application server to the first application server;

receiving, via the second application server, information used for executing the application and the data from the first application server; executing the application; and storing the received data in a second file server of the file servers; and transmitting, via the first management server, an instruction to a network device for constituting the network so that a transmission destination of the request to execute the application transmitted from the device is changed from the first application server to the second application server when the execution of the application and migration of the data in the second application server are completed.

12. The server management program according to claim 11, transmitting, via the first management server configured by the server management program, an instruction to migrate a second application to the second management server which manages the second application server when the first management server receives an instruction to execute the second application which performs operation processing for the data; and transmitting, via the second application server configured by the server management program, operation results of the second application to which the data is inputted to the first server.

* * * * *